United States Patent
Wakabayashi

(10) Patent No.: US 7,277,131 B2
(45) Date of Patent: Oct. 2, 2007

(54) ELECTRONIC CAMERA INCLUDING A DISPLAY FOR DISPLAYING NUMBER OF FRAMES

(75) Inventor: Tsutomu Wakabayashi, Yokohama (JP)

(73) Assignee: Nikon Corporation, Tokyo (JP)

(*) Notice: Subject to any disclaimer, the term of this patent is extended or adjusted under 35 U.S.C. 154(b) by 625 days.

(21) Appl. No.: 10/359,112

(22) Filed: Feb. 6, 2003

(65) Prior Publication Data

US 2004/0212693 A1    Oct. 28, 2004

(30) Foreign Application Priority Data

Feb. 8, 2002    (JP)    ............................. 2002-032636
Jan. 30, 2003    (JP)    ............................. 2003-021580

(51) Int. Cl.
*H04N 5/222* (2006.01)

(52) U.S. Cl. ............................. 348/333.02; 348/231.1

(58) Field of Classification Search .............. 348/231.1
See application file for complete search history.

(56) References Cited

U.S. PATENT DOCUMENTS

| | | | | |
|---|---|---|---|---|
| 5,729,775 A | * | 3/1998 | Ohta et al. | 396/284 |
| 6,407,772 B2 | * | 6/2002 | Mizoguchi | 348/220.1 |
| 2001/0000969 A1 | * | 5/2001 | Ohta et al. | 348/231 |
| 2001/0015760 A1 | * | 8/2001 | Fellegara et al. | 348/333.01 |

FOREIGN PATENT DOCUMENTS

JP    2001-078061    3/2001

* cited by examiner

*Primary Examiner*—Ngoc-Yen Vu
*Assistant Examiner*—Dillon Durnford-Geszvain
(74) *Attorney, Agent, or Firm*—Oliff & Berridge, PLC

(57) ABSTRACT

An electronic camera comprises an image-capturing element; a recording device that records image data constituted of image capturing signals output from the image-capturing element into a data recording medium; a frame number calculating device that calculates a number of frames of image data that have been recorded or can be recorded into the data recording medium; a display device at which the number of frames is displayed; and a control device that controls the display device so as to display at least the number of frames when a main switch is in an OFF state.

10 Claims, 17 Drawing Sheets

ELECTRONIC CAMERA INCLUDING A DISPLAY FOR DISPLAYING NUMBER OF FRAMES

INCORPORATION BY REFERENCE

The disclosures of the following party applications are herein incorporated by reference:
Japanese Patent Application No. 2002-032636 filed Feb. 8, 2002
Japanese Patent Application No. 2003-021580 filed Jan. 30, 2003

BACKGROUND OF THE INVENTION

1. Field of the Invention

The present invention relates to an electronic camera that displays the number of frames.

2. Description of the Related Art

There are electronic cameras known in the related art that display the number of image frames that can be recorded into an available recording area in correspondence to the level of the available capacity in a memory card used to record image data. In such an electronic camera, the number of frames is displayed while the power switch of the electronic camera is in an ON state.

It is recommended that a memory card be loaded into/unloaded from an electronic camera while the power switch of the electronic camera is in an OFF state so as to protect the memory card and the camera circuits. After a memory card is loaded into the electronic camera with the power switch turned off, the power switch must be turned on in order to check the number of remaining frames in the loaded memory card.

SUMMARY OF THE INVENTION

The present invention provides an electronic camera capable of displaying the number of image frames that can be recorded into a data recording medium such as a memory card even when the main switch is in an OFF state.

An electronic camera according to the present invention comprises an image-capturing element; a recording device that records image data constituted of image capturing signals output from the image-capturing element into a data recording medium; a frame number calculating device that calculates a number of frames of image data that have been recorded or can be recorded into the data recording medium; a display device at which the number of frames is displayed; and a control device that controls the display device so as to display at least the number of frames when a main switch is in an OFF state.

In the electronic camera, it is preferred that the control device controls the frame number calculating device and the display device so as to display at least the number of frames when the main switch is in an OFF state.

It is preferred that the control device controls the frame number calculating device and the display device so as to enable display of the number of frames alone.

It is preferred that the control device controls the frame number calculating device and the display device so as to display the number of frames over a predetermined length of time.

It is preferred that the electronic camera further comprises a switch detection device that detects whether the main switch is in the an ON state or an OFF state, wherein when the main switch is detected to be in an OFF state by the switch detection device, the control device controls the frame number calculating device and the display device so as to continuously display at least the number of frames.

It is preferred that the electronic camera further comprises a data recording medium detection device that detects presence/absence of the data recording medium and a switch detection device that detects whether the main switch is in an ON state or an OFF state, wherein when the main switch is detected to be in an OFF state by the switch detection device, the control device controls the data recording medium detection device, the frame number calculating device and the display device so as to display at least the number of frames at the display device over a predetermined length of time in response to a detection of the presence of a data recording medium by the data recording medium detection device. In addition, it is preferred that the display device also displays the information indicating that the data recording medium has not been loaded, and when the main switch is detected to be in an OFF state by the switch detection device, the control device controls the data recording medium detection device and the display device so as to display at least the information indicating that the data recording medium has not been loaded over a predetermined length of time in response to a detection of the absence of a data recording medium by the data recording medium detection device. It is further preferred that even when the data recording medium detection device detects the presence of a data recording medium, the control device controls the display device so as not to display the number of frames if it is decided that no replacement of the data recording medium has occurred.

It is further preferred that the number of frames is represented by a numerical value obtained based upon the recording capacity of the data recording medium.

It is further preferred that the electronic camera further comprises a recording condition holding memory that holds a recording condition set as a condition under which the image data are to be recorded into the data recording medium when the main switch is in an OFF state, wherein the display device also displays information indicating the recording condition, and when the main switch is in an OFF state, the control device controls the frame number calculating device so as to calculate the number of frames based upon the recording condition and the recording capacity of the data recording medium and also controls the display device so as to display the recording condition and the number of frames.

Another electronic camera according to the present invention comprises an image-capturing element; a recording device that records image data constituted of image capturing signals output from the image-capturing element into a data recording medium loaded into the electronic camera; a frame number calculating device that calculates a number of frames of image data that have been recorded or can be recorded into the data recording medium; a display device at which the number of frames having been calculated is displayed; and a recording medium replacement detection device that detects a replacement of the data recording medium, wherein the recording medium replacement detection device repeatedly checks whether or not the data recording medium has been replaced when the main switch is in an OFF state; if the recording medium replacement detection device detects that the data recording medium has been replaced when the main switch is in an OFF state, the frame number calculating device calculates the number of frames of image data that have been recorded or can be recorded into a new data recording medium having replaced the data recording medium; and the display device displays at least the calculated number of frames of image data that have been recorded or can be recorded into the new data recording medium when the main switch is in an OFF state.

In the electronic camera, it is preferred that if the recording medium replacement detection device does not detect that the data recording medium has been replaced when the main switch is in an OFF state, the display device does not display the number of frames, calculated by the frame number calculating device.

It is preferred that the display device displays at least a shutter speed and an aperture effective during a photographing operation in addition to the number of frames when the main switch is in an ON state, and may display the number of frames alone when the main switch is in an OFF state.

It is further preferred that the display device displays at least the calculated number of frames of image data that have been recorded or can be recorded into the new data recording medium over a predetermined length of time when the main switch is in an OFF state.

It is further preferred that the recording medium replacement detection device also repeatedly checks whether or not the data recording medium is present when the main switch is in an OFF state, and if the recording medium replacement detection device detects that the data recording medium is not present when the main switch is in an OFF state, the display device displays the information indicating that the data recording medium has not been loaded.

DESCRIPTION OF THE PREFERRED EMBODIMENTS

The following is an explanation of the embodiments of the present invention, given in reference to the drawings.

First Embodiment

Figure 1:
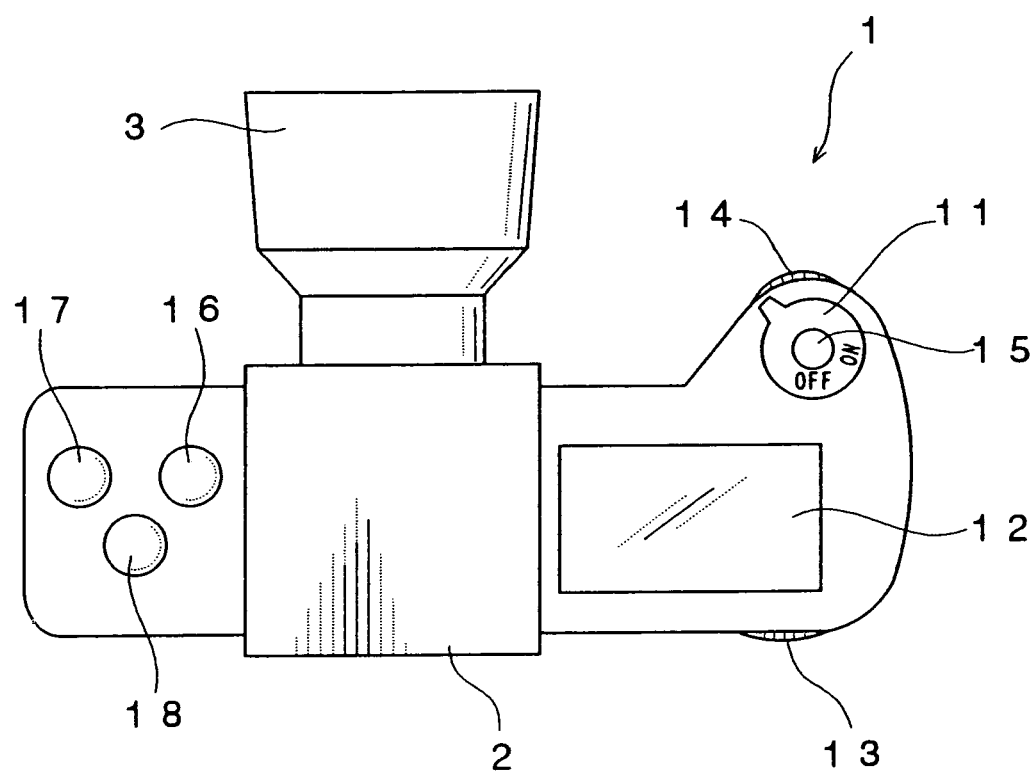
FIG. 1 is a top view of an electronic camera according to a first embodiment of the present invention.

FIG. 1 is a top view of the electronic camera according to the first embodiment of the present invention. An electronic camera 1 is used with an interchangeable lens 3 mounted at a camera body 2. At the camera body 2, a main switch 11, a shutter release button 15, a display device 12, a main command dial 13, a sub-command dial 14, an recording image quality setting switch 16, an exposure correction switch 17 and a white balance setting switch 18 are provided.

Figure 2:
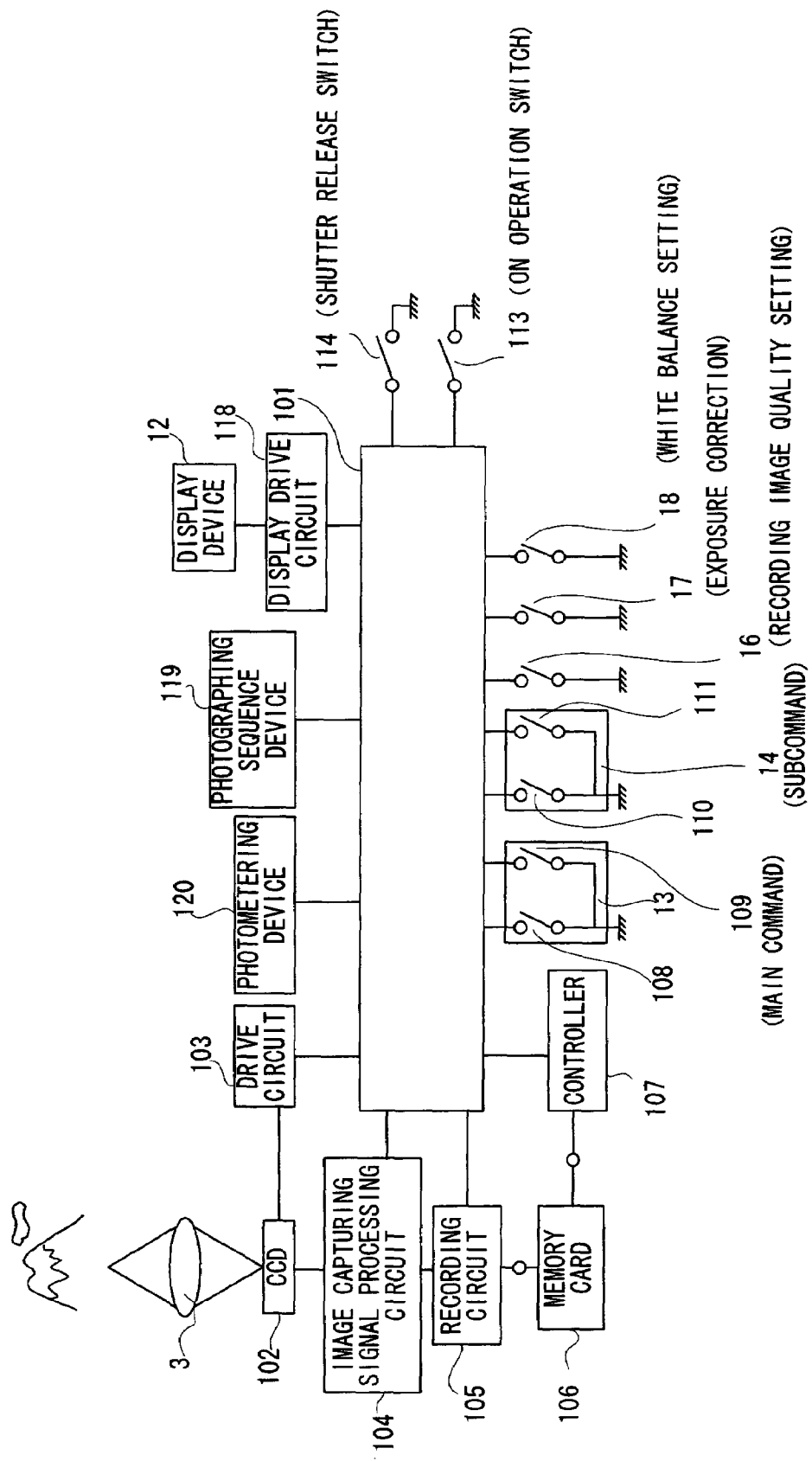
FIG. 2 is a block diagram showing the structure adopted in the electronic camera shown in FIG. 1.

FIG. 2 is a block diagram showing the structure adopted in the electronic camera shown in FIG. 1. In FIG. 2, an image-capturing element 102, which may be a CCD, outputs image capturing signals by capturing a subject image having passed through the interchangeable lens 3. A drive circuit 103 generates a timing signal and provides a drive signal to the image-capturing element 102. The image capturing signals output from the image-capturing element 102 are provided to an image capturing signal processing circuit 104.

The image capturing signal processing circuit 104 includes an A/D conversion circuits (not shown) and converts the analog image capturing signals input from the image-capturing element 102 to digital signals. The image capturing signal processing circuit 104 also executes image processing such as a white balance (WB) adjustment on the digital image capturing signals, compression processing for compressing image data obtained through the image processing into a predetermined format, decompression processing for decompressing compressed data and the like. A recording circuit 105 records image data into a memory card 106 such as a flash memory. The memory card 106 that is a card-type recording medium in which image data having undergone the image processing are recorded can be detachably loaded into the electronic camera. The state of the memory card 106, i.e., whether or not it is currently loaded in the electronic camera, and the recording area inside the memory card 106 are monitored by a controller 107.

A photometering device 120 detects a subject brightness level and outputs a detection signal to an arithmetic operation circuit 101. In addition to the exposure calculation executed by using the brightness detection signal, the arithmetic operation circuit 101 executes the various arithmetic operations that need to be performed in the electronic camera and implements camera operation sequence control. A photographing sequence device 119 implements control on the photographing sequence that includes moving up/down a mirror (not shown), driving an aperture (not shown) and charging a shutter (not shown) by controlling the drive of a sequence motor (not shown) in response to a command issued by the arithmetic operation circuit 101. The display device 12, which may be constituted of, for instance, a liquid crystal display, displays information indicating details of the settings selected for the electronic camera in the form of characters or icons. A display drive circuit 118 drives the display device 12 in response to a command output by the arithmetic operation circuit 101.

A shutter release switch 114, which interlocks with the shutter release button 15 shown in FIG. 1, outputs a release operation signal to the arithmetic operation circuit 101. An ON operation switch 113, which interlocks with the main switch 11 shown in FIG. 1, outputs a power ON operation signal to the arithmetic operation circuit 101. The recording image quality setting switch 16 outputs an operation signal that is related to the required image recording capacity when recording image data into the memory card 106 to the arithmetic operation circuit 101. The exposure correction switch 17 outputs an operation signal related to the exposure correction to the arithmetic operation circuit 101. The white balance setting switch 18 outputs an operation signal related to the white balance setting to the arithmetic operation circuit 101.

The main command dial 13, which is constituted of a switch 108 that outputs an A-phase operation signal and a switch 109 that outputs a B-phase operation signal, outputs operation signals corresponding to a dial rotation operation. The arithmetic operation circuit 101 detects the rotating direction of the main command dial 13 based upon the phase difference between the A-phase signal and the B-phase signal. The sub-command dial 14, which is constituted of a switch 110 that outputs an A-phase operation signal and a switch 111 that outputs a B-phase operation signal, outputs operation signals corresponding to a dial rotation operation. The arithmetic operation circuit 101 detects the rotating direction of the sub-command dial 14 based upon the phase difference between the A-phase signal and the B-phase signal.

If the main command dial 13 is rotated while the recording image quality setting switch 16 is in an operated state, the arithmetic operation circuit 101 issues the following instruction to the image capturing signal processing circuit 104 in correspondence to the rotating operation. Namely, it issues an instruction for the image capturing signal processing circuit 104 indicating whether or not the image processing is to be executed and indicating the compression rate to be set for the compression processing, so as to adjust the recording image quality at which the image data are to be recorded into the memory card 106. The recording image quality may be set at one of the following five levels, for instance.

Image quality 1 "RAW" at which the image data are recorded directly, without undergoing image processing Image quality 2 "TIFF" at which the image data having undergone image processing are recorded in an non-compressed state Image quality 3 "FINE" at which the image data having undergone image processing are recorded at a compression rate of approximately ¼

Image quality 4 "NORMAL" at which the image data having undergone image processing are recorded at a compression rate of approximately ⅛

Image quality 5 "BASIC" at which the image data having undergone image processing are recorded at a compression rate of approximately 1/16

If the sub-command dial 14 is rotated while the recording image quality setting switch 16 is in an operated state, the arithmetic operation circuit 101 issues the following instruction to the drive circuit 103 and the image capturing signal processing circuit 104 in correspondence to the rotating operation. Namely, it issues an instruction for the drive circuit 103 and the image capturing signal processing circuit 104 with regard to an adjustment of the number of signals per image plane (the number of pixels per image) to be read out from the image-capturing element 102. As a result, the number of recording pixels to be used to record the image data into the memory card 106 is adjusted. The number of recording pixels may be set at one of the following three levels, for instance.

Pixel number 1 "L size" at which a single image plane is made up with 2048×1536 pixels Pixel number 2 "M size" at which a single image plane is made up with 1024×768 pixels Pixel number 3 "S size" at which a single image plane is made up with 640×480 pixels If the main command dial 13 is rotated while the exposure correction switch 17 is in an operated state, the arithmetic operation circuit 101 corrects the exposure value either along the +direction or the −direction in correspondence to the rotating operation. When the exposure correction value is set to 0, the exposure correction setting is cleared.

If the main command dial 13 is rotated while the white balance setting switch 18 is in an operated state, the arithmetic operation circuit 101 outputs a switching instruction indicating whether to select Auto WB or Manual WB to the image capturing signal processing circuit 104 in correspondence to the rotating operation. If Auto WB is selected, a WB adjustment value is calculated through a predetermined arithmetic operation in correspondence to the color components of the image capturing signals and the WB adjustment is executed by using the WB adjustment value thus calculated. If Manual WB is selected, the WB adjustment is executed by using a WB adjustment value which is selected in advance for the specific type of illuminating light, e.g., incandescent light or sunlight.

The present invention is characterized by the display brought up at the display device 12 to indicate the number of images (the number of remaining frames) that can be recorded into the available area (the remaining area) at the memory card 106 among various displays achieved at the display device 12 of the electronic camera described above, and more specifically, it is characterized in that the number of remaining frames is displayed even when the main switch of the electronic camera is in an OFF state. The number of remaining frames increases/decreases as the required image recording capacity with regard to the image data to be recorded changes, i.e., as at least either the number of recording pixels per image or the recording image quality of an image changes.

Figure 3:
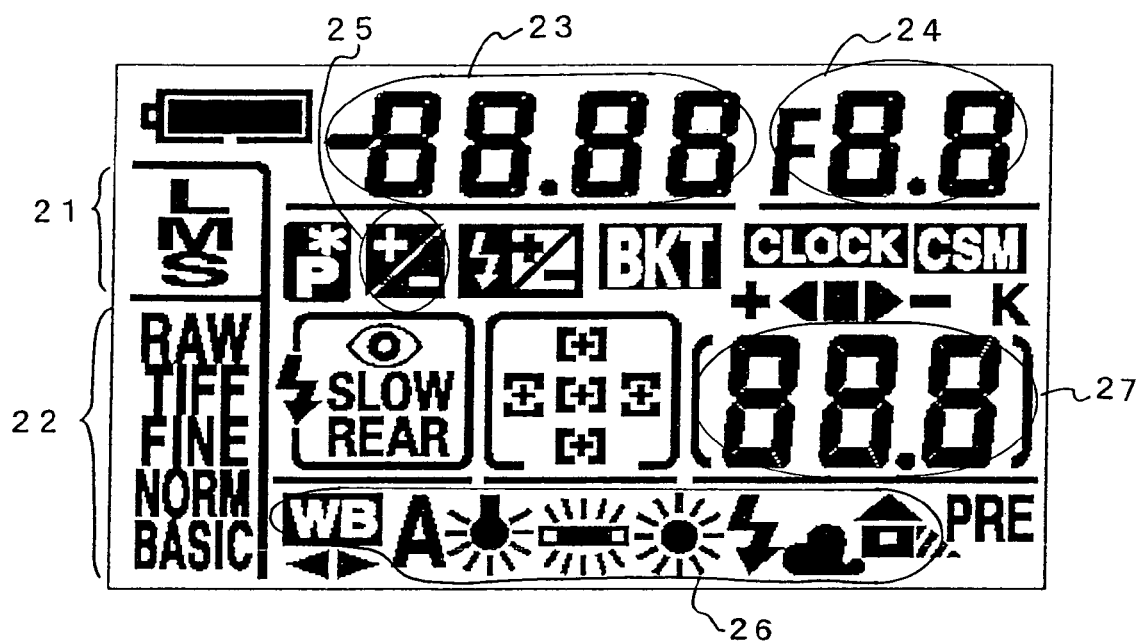
FIG. 3 illustrates display segments at the display device.

FIG. 3 shows the display segments of the display device 12. A pixel number segment 21 is used to display the number of recording pixels. "L" in the pixel number segment 21 is displayed if the pixel number 1 mentioned earlier is selected. "M" in the pixel number segment 21 is displayed if the pixel number 2 mentioned earlier is selected. "S" in the pixel number segment 21 is displayed if the pixel number 3 mentioned earlier is selected.

An image quality segment 22 is used to display the recording image quality. "RAW" in the image quality segment 22 is displayed when the image quality 1 is selected. "TIFF" in the image quality segment 22 is displayed when the image quality 2 is selected. "FINE" in the image quality segment 22 is displayed when the image quality 3 is selected. "NORM" in the image quality segment 22 is displayed when the image quality 4 is selected. "BASIC" in the image quality segment 22 is displayed when the image quality 5 is selected.

A segment 23 is used to display a shutter time (shutter speed) during a photographing operation. A segment 24 is used to display the aperture value during the photographing operation. An exposure correction display segment 25 is used to bring up a display for the exposure correction setting. A white balance display segment 26 is used for the white balance display. In FIG. 3, "A" indicates the auto white balance (WB) setting, and the icons to the right of "A" each indicate a specific manual WB setting. The icons to the right of "A" indicate, from left to right, illumination from incandescent light, fluorescent light, bright sunlight, electronic flash, bright overcast, shade. A numerical value segment 27 is used for a counter display of the number of remaining frames or the like. The numerical value segment 27, which includes three display sections each constituted of seven elements, is capable of displaying numerical values having up to three digits.

While the display device 12 includes segments other than those explained above, an explanation of segments which do not constitute the feature of the present invention is omitted.

Figure 4:
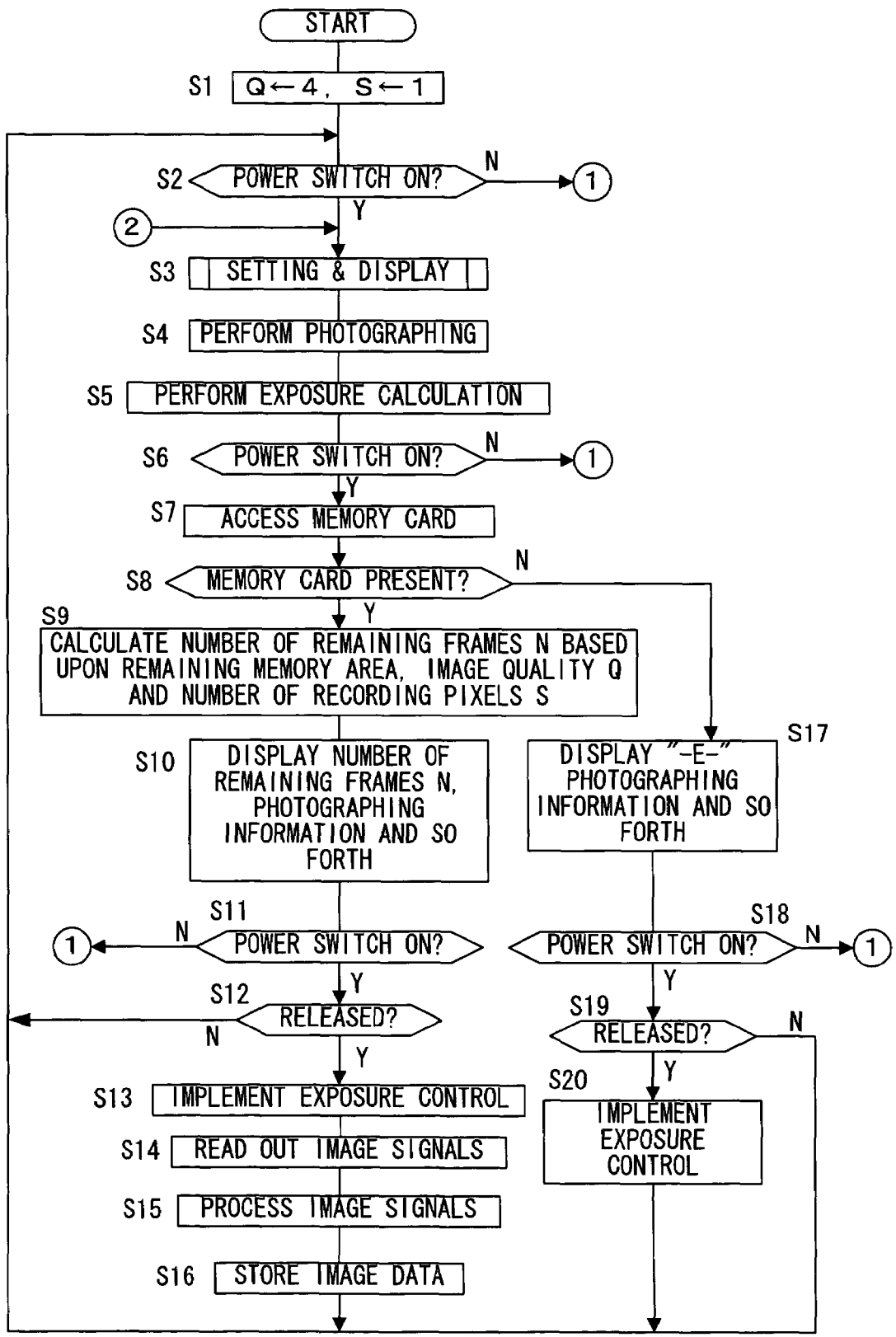
FIG. 4 presents a flowchart of the camera operation processing executed in the arithmetic operation circuit of the electronic camera.
Figure 5:
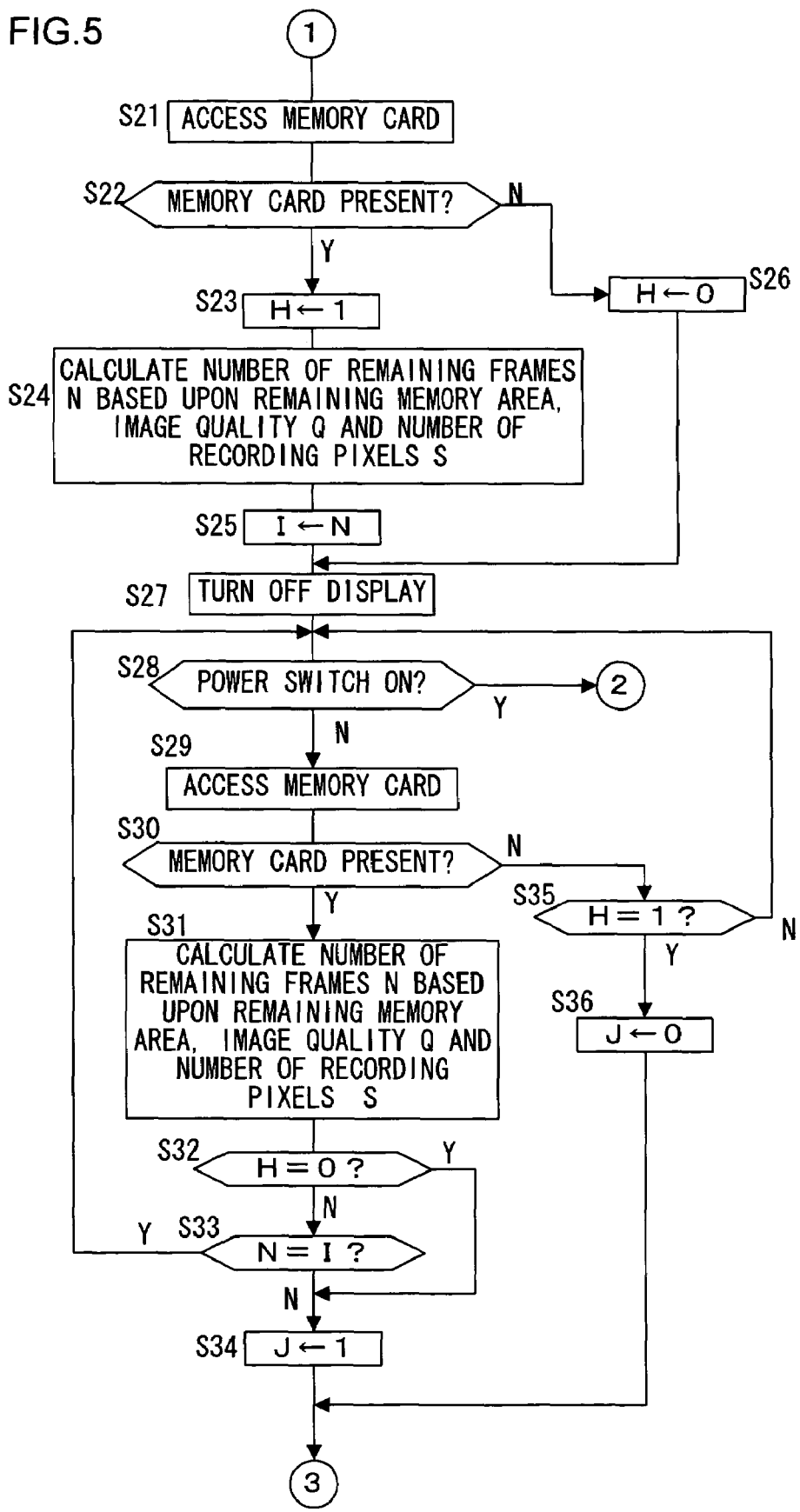
FIG. 5 presents a flowchart of the processing executed in the arithmetic operation circuit of the electronic camera when the power is in an OFF state.
Figure 6:
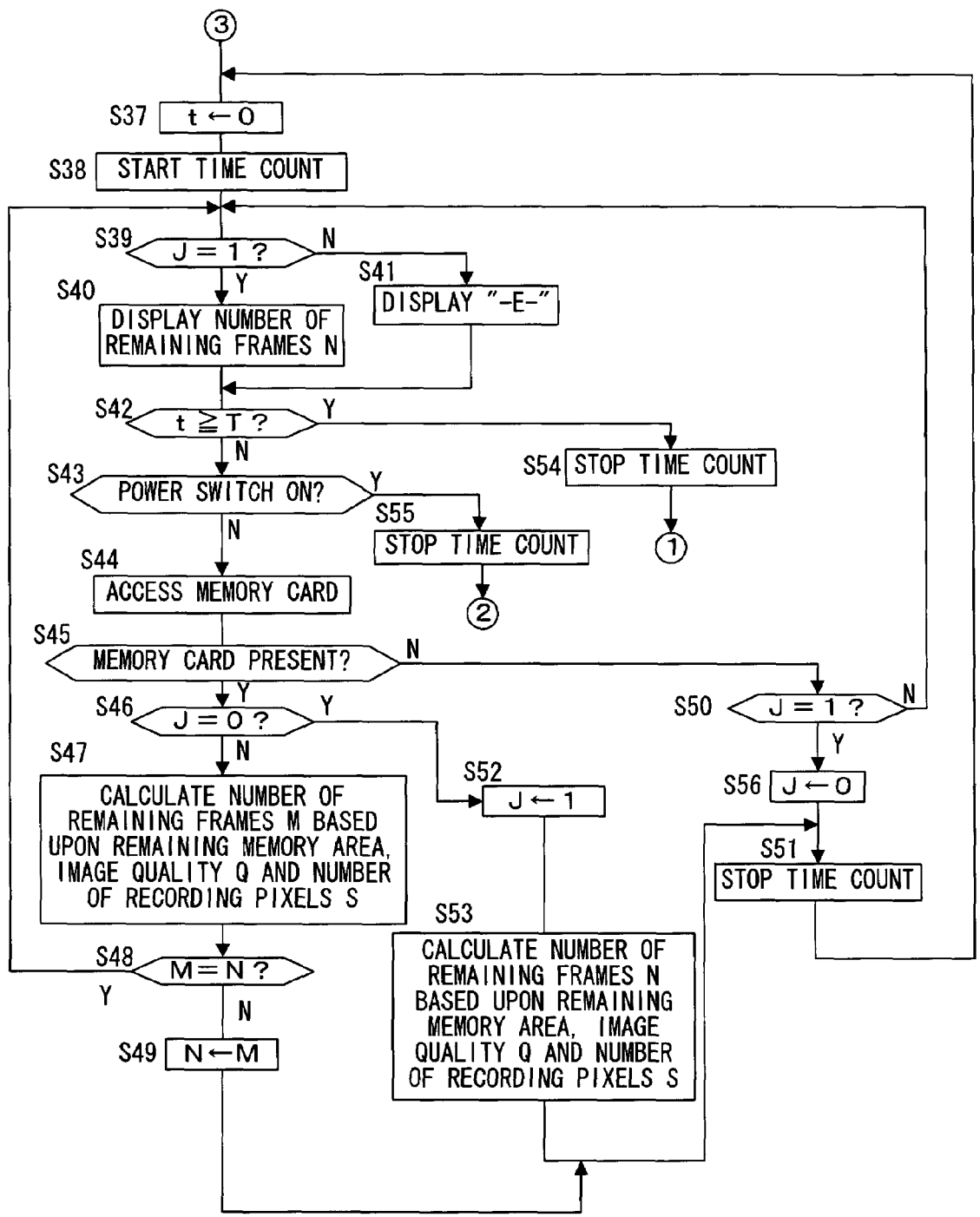
FIG. 6 presents a flowchart of the processing executed in the arithmetic operation circuit of the electronic camera when the power is in an OFF state.

The camera operation processing executed in the arithmetic operation circuit 101 of the electronic camera is now explained in reference to the flowchart presented in FIGS. 4-6. The program of the processing shown in FIGS. 4-6 is started up as batteries (not shown) are loaded into the electronic camera and is repeatedly executed subsequently. In step S1 shown in FIG. 4, the arithmetic operation circuit 101 performs the following initial setting operation. Namely, it sets 4 for an image quality flag Q and sets 1 for a pixel number flag S, before the operation proceeds to step S2.

One of the values 1-5 is set for the image quality flag Q in correspondence to the recording image quality 1-5 explained earlier. "NORMAL" is selected as the initial recording image quality setting. One of the values 1-3 is set for the pixel number flag S in correspondence to the recording pixel number 1-3 explained earlier. "L-size" is selected as the initial recording pixel number setting.

In step S2, the arithmetic operation circuit 101 makes a decision as to whether or not the power switch has been turned on. The arithmetic operation circuit 101 makes an affirmative decision in step S2 if a power ON operation signal has been input from the ON operation switch 113 to proceed to step S3, whereas it makes a negative decision in step S2 if no power ON operation signal has been input to proceed to step S21 shown in FIG. 5. The operation proceeds to step S3 if the main switch 11 (see FIG. 1) of the electronic camera is in an ON state, whereas the operation proceeds to step S21 if the main switch 11 (see FIG. 1) of the electronic camera is in an OFF state.

In step S3, the arithmetic operation circuit 101 executes setting & display processing before the operation proceeds to step S4. The setting & display processing is to be detailed later. In step S4, the arithmetic operation circuit 101 performs a photometering operation to calculate the subject brightness level by using a detection signal input from the photometering device 120, and then the operation proceeds to step S5. In step S5, the arithmetic operation circuit 101 executes specific exposure calculation processing before the operation proceeds to step S6.

In step S6, the arithmetic operation circuit 101 makes a decision as to whether or not the power switch has been turned on. The arithmetic operation circuit 101 makes an affirmative decision in step S6 if a power ON operation signal has been input from the ON operation switch 113 to proceed to step S7, whereas it makes a negative decision in step S6 if no power ON operation signal has been input to proceed to step S21 shown in FIG. 5.

In step S7, the arithmetic operation circuit 101 outputs a command for the controller 107 to access the memory card 106, and then the operation proceeds to step S8. In step S8, the arithmetic operation circuit 101 makes a decision as to whether or not the memory card 106 has been loaded into the camera. If the controller 107 having accessed 106 as described above detects the presence of the memory card 106 in the camera, the arithmetic operation circuit 101 makes an affirmative decision in step S8 to proceed to step S9, whereas if the presence of the memory card 106 is not detected, the arithmetic operation circuit 101 makes a negative decision in step S8 to proceed to step S17.

In step S9, the arithmetic operation circuit 101 calculates the number of frames of images that can be recorded into the available area, i.e., the number of remaining frames N, based upon the recording capacity (the remaining capacity) corresponding to the available area at the memory card 106 detected by the controller 107 and the number of recording pixels and the recording image quality set at the electronic camera, and then the operation proceeds to step S10. The number of remaining frames N is determined by dividing the remaining capacity by the required image recording capacity per image. The number of remaining frames N changes if either the number of recording pixels or the recording image quality is changed.

Figure 7:
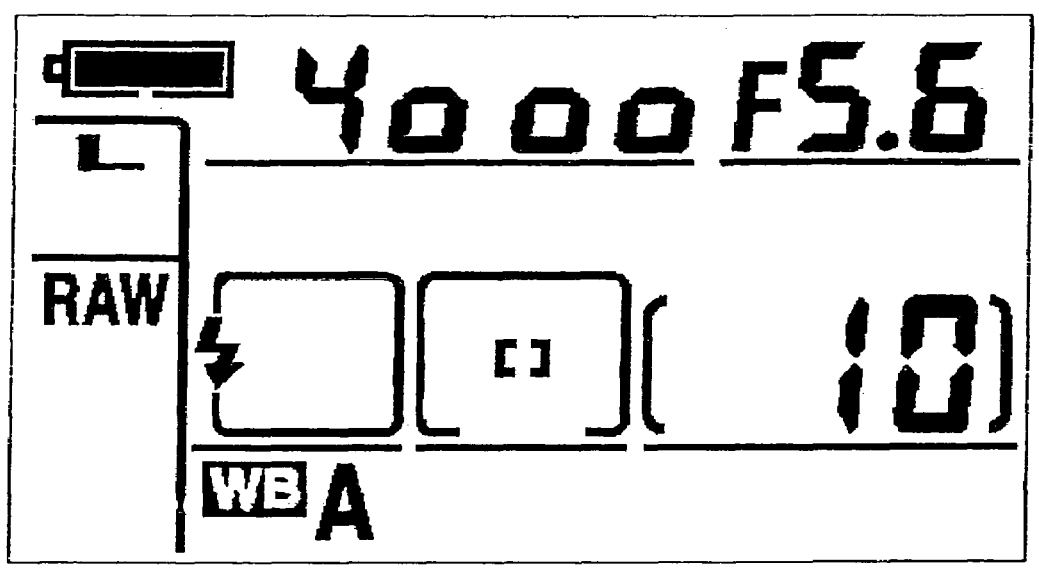
FIG. 7 presents an example of a display of the number of remaining frames.

In step S10, the arithmetic operation circuit 101 outputs a command for the display drive circuit 118 to display the value representing the number of remaining frames N, photographing information such as the shutter speed and the aperture value, the recording image quality, the number of recording pixels and the like at the display device 12 before the operation proceeds to step S11. FIG. 7 presents an example of a display that may be brought up at the display device 12. In FIG. 7, "L-size" and "RAW" in segment 21 and segment 22 are displayed to indicate that these settings have been selected for the number of recording pixels and the recording image quality respectively. In addition, the auto WB settings is displayed in segment 26 and a numerical value "10" is displayed in the numerical value segment 27 to indicate the number of remaining frames N.

In step S11 the arithmetic operation circuit 101 makes a decision as to whether or not the power switch has been turned on. The arithmetic operation circuit 101 makes an affirmative decision in step S11 if a power ON operation signal has been input from the ON operation switch 113 to proceed to step S12, whereas it makes a negative decision in step S11 if no power ON operation signal has been input to proceed to step S21 shown in FIG. 5.

In step S12, the arithmetic operation circuit 101 makes a decision as to whether or not a release operation signal has been input from the shutter release switch 114. The arithmetic operation circuit 101 makes an affirmative decision in step S12 if a release operation signal has been input to proceed to step S13, whereas it makes a negative decision in step S12 if no release operation signal has been input to return to step S2.

In step S13, the arithmetic operation circuit 101 engages the drive circuit 103 to start drive of the image-capturing element 102 and also outputs a command for the photographing sequence control device 119 to implement exposure control including aperture control (not shown) and shutter control (not shown), before the operation proceeds to step S14. In response, the image-capturing element 102 stores electrical charges over a predetermined length of time in correspondence to the intensity of the subject light entering its image capturing surface. In step S14, the arithmetic operation circuit 101 outputs a command for the drive circuit 103 to read out the image capturing signals at pixels, the number of which corresponds to the value indicated at the flag S, from the image-capturing element 102, and then the operation proceeds to step S15.

In step S15, the arithmetic operation circuit 101 issues an instruction for the image capturing signal processing circuit 104 to execute the image signal processing and then the operation proceeds to step S16. It is to be noted that if Q=1 (the recording image quality is "RAW"), the operation proceeds to step S16 by skipping step S15. In step S16, the arithmetic operation circuit 101 issues an instruction for the image capturing signal processing circuit 104 to execute the compression processing at the compression rate corresponding to the value set at the flag Q and also issues an instruction for the recording circuit 105 to record the image data having undergone the compression processing into the memory card 106. It is to be noted that if Q=1 (the recording image quality is "RAW") or Q=2 (the recording image quality is "TIFF"), the image data are recorded uncompressed and, accordingly, the compression processing is skipped.

Once the image data are recorded into the memory card 106, the arithmetic operation circuit 101 returns to step S2 and ends the sequence of photographing processing. Since the processing shown in FIG. 4 is repeatedly executed when the photographing processing ends, the display indicating the number of remaining frames N is updated each time a frame is recorded.

Figure 8:
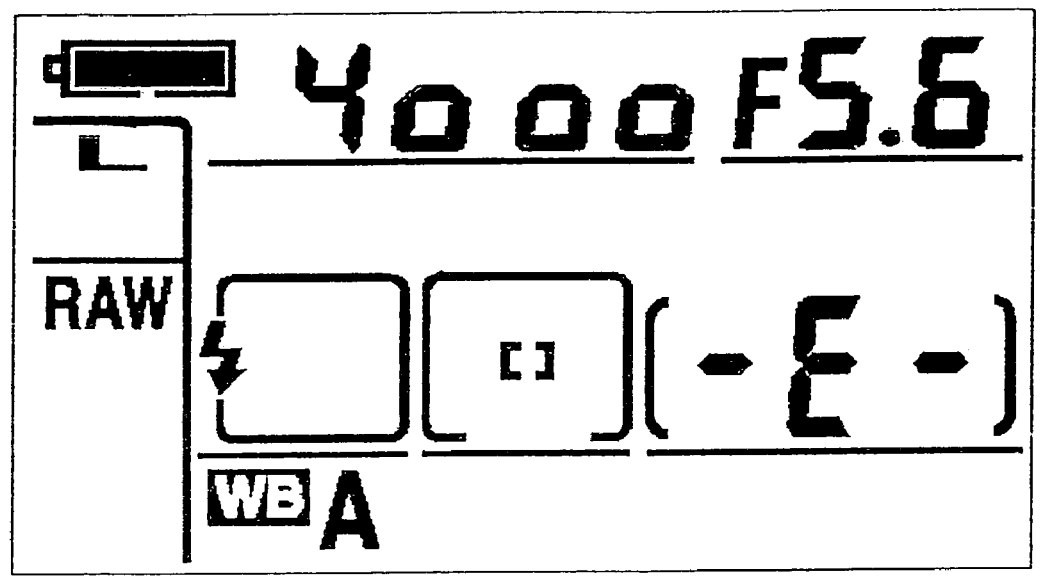
FIG. 8 presents an example of display that may be brought up when no memory card is loaded.

In step S17, to which the operation proceeds after making a negative decision in step S8, as described above, the arithmetic operation circuit 101 outputs a command for the display drive circuit 118 to bring up a display which includes information indicating that no memory card 106 has been loaded, the photographing information such as the shutter speed and the aperture value, the recording image quality and the number of recording pixels, at the display device 12 before the operation proceeds to step S18. FIG. 8 presents an example of a display that may be brought up at the display device 12 at this time. In FIG. 8, "L-size" and "RAW" in segment 21 and segment 22 are displayed to indicate that these settings have been selected. In addition, the auto WB setting is displayed in segment 26 and "-E-" is displayed in the numerical value segment 27 to indicate that the memory card 106 has not been loaded.

In step S18, the arithmetic operation circuit 101 makes a decision as to whether or not the power switch has been turned on. The arithmetic operation circuit 101 makes an affirmative decision in step S18 if a power ON operation signal has been input from the ON operation switch 113 to proceed to step S19, whereas it makes a negative decision in step S18 if no power ON operation signal has been input to proceed to step S21 shown in FIG. 5.

In step S19, the arithmetic operation circuit 101 makes a decision as to whether or not a release operation signal has been input from the shutter release switch 114. The arithmetic operation circuit 101 makes an affirmative decision in step S19 if a release operation signal has been input to proceed to step S20, whereas it makes a negative decision in step S19 if no release operation signal has been input to return to step S2.

In step S20, the arithmetic operation circuit 101 engages the drive circuit 103 to start drive of the image-capturing element 102 and also outputs a command for the photographing sequence control device 119 to implement exposure control including aperture control (not shown) and shutter control (not shown). When the exposure control is completed, the arithmetic operation circuit 101 returns to step S2 to end the sequence of photographing processing. If no memory card 106 is loaded, the image data are not recorded.

The processing shown in FIGS. 5 and 6 is executed when the power switch is in an OFF state. Power is supplied from the batteries (not shown) to the arithmetic operation circuit 101, the controller 107, the memory card 106, the display drive circuit 118 and the display device 12 in the electronic camera according to the embodiment even when the main switch 11 (see FIG. 1) is in an OFF state.

In step S21, the arithmetic operation circuit 101 outputs a command for the controller 107 to access the memory card 106, and then the operation proceeds to step S22. In step S22, the arithmetic operation circuit 101 makes a decision as to whether or not the memory card 106 has been loaded into the camera. If the controller 107 having accessed the memory card 106 as described above detects the presence of the memory card 106 in the camera, the arithmetic operation circuit 101 makes an affirmative decision in step S22 to proceed to step S23, whereas if the presence of the memory card 106 is not detected, the arithmetic operation circuit 101 makes a negative decision in step S22 to proceed to step S26.

In step S23, the arithmetic operation circuit 101 sets 1 for a flag H and then the operation proceeds to step S24. The flag H is set to 1 if it is determined that a memory card is present and is set to 0 if it is determined that no memory card is present in the camera in the decision-making with regard to the presence/absence of a memory card executed when the power is in an OFF state. In step S26, the arithmetic operation circuit 101 sets 0 for the flag H before the operation proceeds to step S27.

In step S24, the arithmetic operation circuit 101 calculates the number of remaining frames N of images that can be recorded into the available area based upon the recording capacity corresponding to the available (remaining) area at the memory card 106 detected by the controller 107 and the number of recording pixels and the recording image quality set at the electronic camera, and then the operation proceeds to step S25. It is to be noted that the information indicating the settings for the number of recording pixels and the recording image quality is held in a register within the arithmetic operation circuit 101 even when the power switch is in an OFF state. Thus, the arithmetic operation circuit 101 is able to calculate the number of remaining frames N by using the information held at the register.

In step S25, the arithmetic operation circuit 101 stores the calculated value N at a register I, and then the operation proceeds to step S27. In step S27, the arithmetic operation circuit 101 outputs a command for the display drive device 118 to turn off the display at the segments of the display device 12 before the operation proceeds to step S28. As a result, the display at the display device 12 is turned off.

In step S28, the arithmetic operation circuit 101 makes a decision as to whether or not the power switch has been turned on. The arithmetic operation circuit 101 makes an affirmative decision in step S28 if a power ON operation signal has been input from the ON operation switch 113 to proceed to step S3 shown in FIG. 4, whereas it makes a negative decision in step S28 if no power ON operation signal has been input to proceed to step S29.

In step S29, the arithmetic operation circuit 101 outputs a command for the controller 107 to access the memory card 106, and then the operation proceeds to step S30. In step S30, the arithmetic operation circuit 101 makes a decision as to whether or not the memory card 106 has been loaded into the camera. If the controller 107 having accessed the memory card 106 as described above detects the presence of the memory card 106 in the camera, the arithmetic operation circuit 101 makes an affirmative decision in step S30 to proceed to step S31, whereas if the presence of the memory card 106 is not detected, the arithmetic operation circuit 101 makes a negative decision in step S30 to proceed to step S35.

In step S31, the arithmetic operation circuit 101 calculates the number of remaining frames N of images that can be recorded into the available area based upon the recording capacity corresponding to the available (remaining) area at the memory card 106 detected by the controller 107 and the number of recording pixels and the recording image quality set at the electronic camera, and then the operation proceeds to step S32. In step S32, the arithmetic operation circuit 101 makes a decision as to whether or not the flag H is set to 0. The arithmetic operation circuit 101 makes an affirmative decision in step S32 if H=0 to proceed to step S34, whereas it makes a negative decision in step S32 if H=1 to proceed to step S33. The operation proceeds to step S34 if the presence of a memory card is detected after making a decision that no memory card has been loaded, whereas the operation proceeds to step S33 if the decision that the memory card is present in the camera is continuously being executed.

In step S33, the arithmetic operation circuit 101 makes a decision as to whether or not the number of remaining frames N calculated in step S31 is equal to the values stored at the register I. The arithmetic operation circuit 101 makes an affirmative decision in step S33 if N=I to return to step S28, whereas it makes a negative decision in step S33 if N≠1 to proceed to step S34. The operation returns to step S28 if the same memory card is still present in the electronic camera, whereas the operation proceeds to step S34 if the original memory card has been replaced with another memory card.

In step S34, the arithmetic operation circuit 101 sets 1 for a flag J and then the operation proceeds to step S37 shown in FIG. 6. The flag J is set to 1 if a memory card 106 is loaded (or replaced with another memory card) at the camera while the power is in an OFF state and is set to 0 if the memory card 106 has been removed from the electronic camera while the power is in an OFF state. In step S35, to which the operation proceeds after making a negative decision in step S30, on the other hand, the arithmetic operation circuit 101 makes a decision as to whether or not the flag H is set to 1. The arithmetic operation circuit 101 makes an affirmative decision in step S35 if H=1 to proceed to step S36, whereas it makes an negative decision in step S35 if H=0 to return to step S28. The operation proceeds to step S36 if the memory card is determined to have been unloaded after detecting its presence in the electronic camera, whereas the operation returns to step S28 if a decision that there is no memory card in the electronic camera is continuously held. In step S36, the arithmetic operation circuit 101 sets 0 for the flag J before the operation proceeds to step S37 shown in FIG. 6.

In step S37 shown in FIG. 6, the arithmetic operation circuit 101 resets a time length t to 0 before the operation proceeds to step S38. In step S38, the arithmetic operation circuit 101 starts a count of the time length t before the operation proceeds to step S39. In step S39, the arithmetic operation circuit 101 makes a decision as to whether or not the flag J is set to 1. The arithmetic operation circuit 101 makes an affirmative decision in step S39 if J=1 to proceed to step S40, whereas it makes a negative decision in step S39 if J=0 to proceed to step S41.

Figure 9:
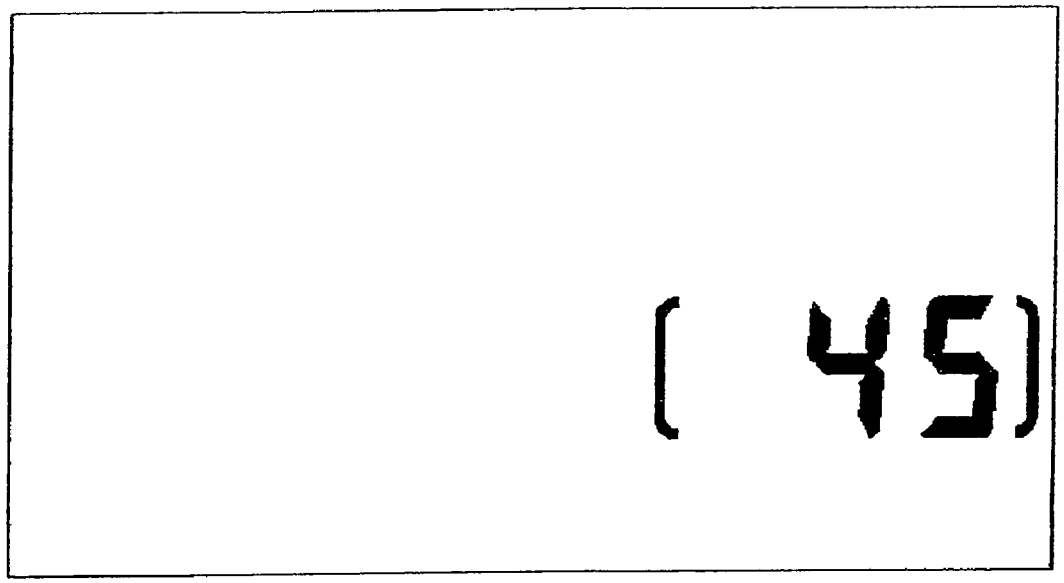
FIG. 9 presents an example of a display of the number of remaining frames that may be brought up when the power is in an OFF state.

In step S40, the arithmetic operation circuit 101 outputs a command for the display drive circuit 118 to bring up a display of the value representing the number of remaining frames N at the display device 12 before the operation proceeds to step S42. FIG. 9 presents an example of a display that may be brought up at the display device 12 at this time. In FIG. 9, a value "45" is displayed in the numerical value segment 27 to indicate the number of remaining frames N.

Figure 10:
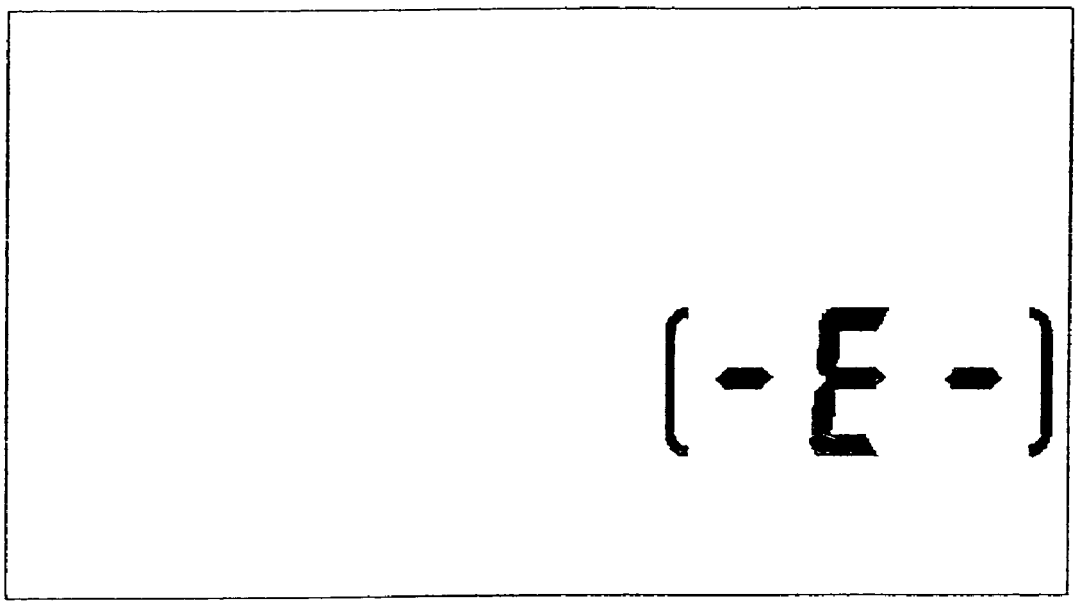
FIG. 10 presents an example of a display that may be brought up when the power is in an OFF state and no memory card is loaded.

In step S41, the arithmetic operation circuit 101 outputs a command for the display drive circuit 118 to bring up a display indicating that the memory card 106 has not been loaded at the display device 12 before the operation proceeds to step S42. FIG. 10 presents an example of a display that may be brought up at the display device 12 at this time. In FIG. 10, "-E-" indicating that no memory card 106 is loaded is displayed in the numerical value segment 27

In step S42, the arithmetic operation circuit 101 makes a decision as to whether or not the time length t, which has been counted and a predetermined length of time T achieve a a relationship expressed as t≧T. If the relationship expressed as t≧T is achieved, the arithmetic operation circuit 101 makes an affirmative decision in step S42 to proceed to step S54. In step S54, the arithmetic operation circuit 101 stops the count of the time length t and the operation returns to step S21 shown in FIG. 5. If, on the other hand, the relationship t≧T is not achieved, the arithmetic operation circuit 101 makes a negative decision in step S42 to proceed to step S43.

In step S43, the arithmetic operation circuit 101 makes a decision as to whether or not the power switch has been turned on. The arithmetic operation circuit 101 makes an affirmative decision in step S43 if a power ON operation signal has been input from the ON operation switch 113 to proceed to step S55. In step S55, the arithmetic operation circuit 101 stops the count of the time length t before the operation returns to step S3 shown in FIG. 4. If, on the other hand, no power ON operation signal has been input from the ON operation switch 113, the arithmetic operation circuit 101 makes a negative decision in step S43 to proceed to step S44.

In step S44, the arithmetic operation circuit 101 outputs a command for the controller 107 to access the memory card 106, and then the operation proceeds to step S45. In step S45, the arithmetic operation circuit 101 makes a decision as to whether or not the memory card 106 has been loaded into the camera. If the controller 107 having accessed the memory card 106 as described above detects the presence of the memory card 106 in the camera, the arithmetic operation circuit 101 makes an affirmative decision in step S45 to proceed to step S46, whereas if the presence of the memory card 106 is not detected, the arithmetic operation circuit 101 makes a negative decision in step S45 to proceed to step S50.

In step S46, the arithmetic operation circuit 101 makes a decision as to whether or not the flag J is set to 0. The arithmetic operation circuit 101 makes an affirmative decision in step S46 if J=0 to proceed to step S52, whereas it makes a negative decision in step S46 if J=1 to proceed to step S47. The operation proceeds to step S52 if it is decided that a new memory card has been loaded into the empty electronic camera, whereas the operation proceeds to step S47 if the decision that a memory card is present in the electronic camera is continuously being executed.

In step S50, the arithmetic operation circuit 101 makes a decision as to whether or not the flag J is set to 1. The arithmetic operation circuit 101 makes an affirmative decision in step S50 if J=1 to proceed to step S56, whereas it makes a negative decision in step S50 if J=0 to return to step S39. The operation proceeds to step S56 if it is decided that the memory card in the electronic camera has been unloaded, whereas the operation returns to step S39 if the electronic camera is determined to be without a memory card continuously. In step S56, the arithmetic operation circuit 101 sets the flag J to 0 and then the operation proceeds to step S51. In step S51, the arithmetic operation circuit 101 stops the count of the time length t before the operation returns to step S37. As a result, if a memory card is present, the number of remaining frames available in the memory card is displayed, whereas if no memory card is present in the electronic camera, the information indicating that no memory card has been loaded is displayed, over the predetermined length of time T.

In step S47, the arithmetic operation circuit 101 calculates the number of remaining frames M of images that can be recorded into the available area based upon the recording capacity corresponding to the available (remaining) area at the memory card 106 detected by the controller 107 and the number of recording pixels and the recording image quality set at the electronic camera, and then the operation proceeds to step S48. In step S48, the arithmetic operation circuit 101 makes a decision as to whether or not the calculated value M and the previously calculated value N achieve a relationship expressed as M=N. The arithmetic operation circuit 101 makes an affirmative decision in step S48 if M=N to return to step S39, whereas it makes a negative decision in step S48 if M≠N to proceed to step S49. The operation returns to step S39 if the same memory card is still present in the electronic camera, whereas the operation proceeds to step S49 if the original memory card has been replaced with another memory card. In step S49, the arithmetic operation circuit 101 substitutes N with the calculated value M and the operation proceeds to step S51. As a result, the operation returns to step S37 after stopping the count of the time length t (step S51) and the most recently calculated number of remaining frames is displayed over a predetermined length of time.

In step S52, to which the operation proceeds after making an affirmative decision in step S46, on the other hand, the arithmetic operation circuit 101 sets the flag J to 1 and then the operation proceeds to step S53. In step S53, the arithmetic operation circuit 101 calculates the number of remaining frames N of images that can be recorded into the available area based upon the recording capacity corresponding to the available (remaining) area at the memory card 106 detected by the controller 107 and the number of recording pixels and the recording image quality set at the electronic camera, and then the operation proceeds to step S51. Since the operation subsequently proceeds to step S40 via step S37, the most recently calculated number of remaining frames is displayed over a predetermined length of time.

Figure 11:
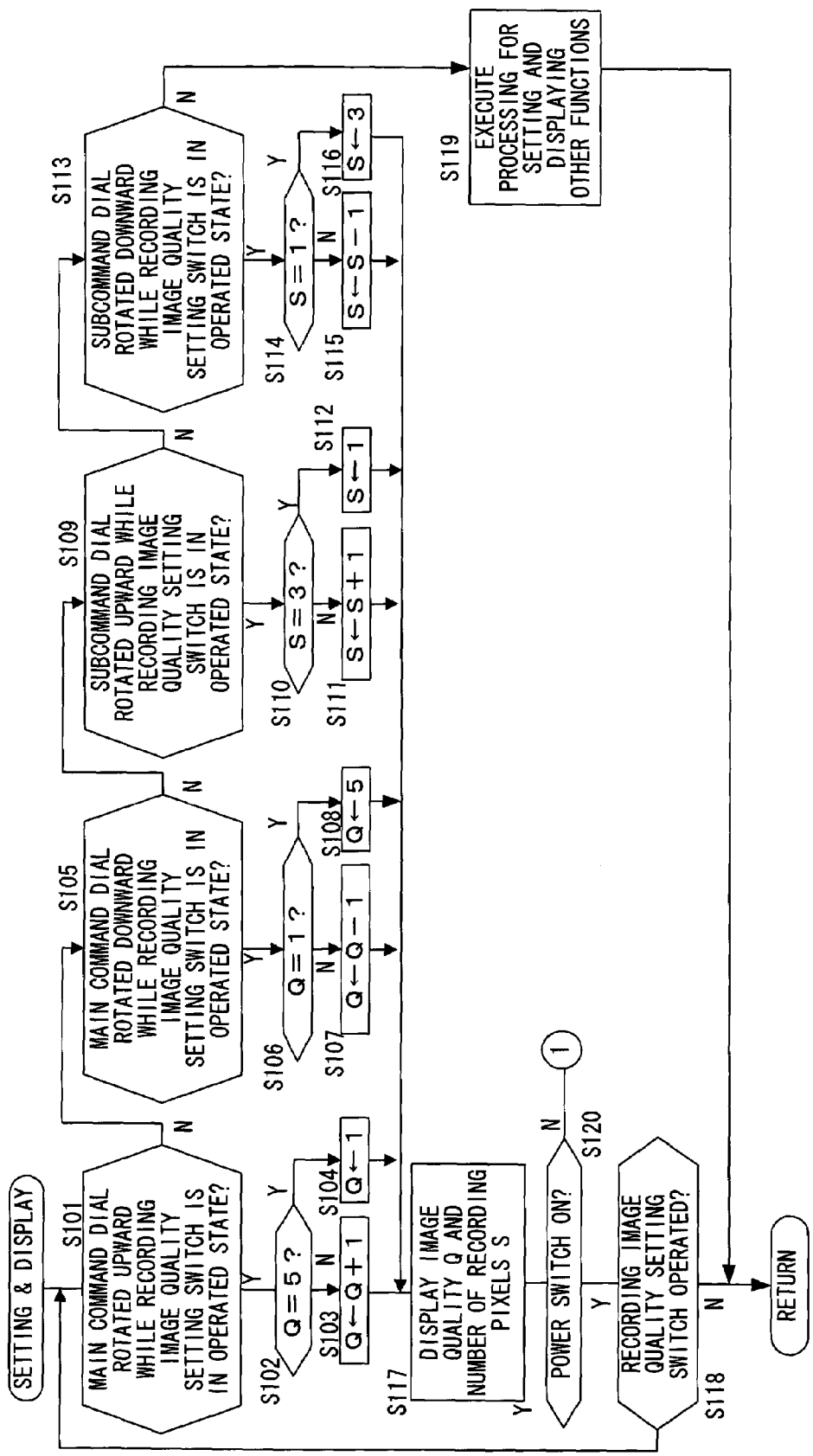
FIG. 11 presents a detailed flowchart of the setting/display processing.

The setting & display processing is now explained in detail in reference to the flowchart presented in FIG. 11. In step S101, the arithmetic operation circuit 101 makes a decision as to whether or not operation signals indicating an upward rotation have been input from the switches 108 and 109 of the main command dial 13 while the recording image quality setting switch 16 is in an operated state. The upward rotation may be, for instance, a clockwise rotation. The arithmetic operation circuit 101 makes an affirmative decision in step S101 if operation signals indicating an upward rotation have been input to proceed to step S102, whereas it makes a negative decision in step S101 if no operation signal indicating an upward rotation has been input to proceed to step S105.

In step S102, the arithmetic operation circuit 101 makes a decision as to whether or not the flag Q is set to 5. The arithmetic operation circuit 101 makes an affirmative decision in step S102 if Q=5 (the recording image quality is set to "BASIC") to proceed to step S104, whereas it makes a negative decision in step S102 if Q≠5 to proceed to step S103. Instep S103, the arithmetic operation circuit 101 adds 1 to the value of Q before the operation proceeds to step S117. Instep S104, the arithmetic operation circuit 101 sets Q to 1 and then the operation proceeds to step S117. Since 1 is set for Q in place of 5 when an upward rotation is indicated, the value of Q is cyclically set.

In step S105, the arithmetic operation circuit 101 makes a decision as to whether or not operation signals indicating a downward rotation have been input from the switches 108 and 109 of the main command dial 13 while the recording image quality setting switch 16 is in an operated state. The downward rotation may be, for instance, a counterclockwise rotation. The arithmetic operation circuit 101 makes an affirmative decision in step S105 if operation signals indicating a downward rotation have been input to proceed to step S106, whereas it makes a negative decision in step S105 if no operation signal indicating an downward rotation has been input to proceed to step S109.

In step S106, the arithmetic operation circuit 101 makes a decision as to whether or not the flag Q is set to 1. The arithmetic operation circuit 101 makes an affirmative decision in step S106 if Q=1 (the recording image quality is set to "RAW") to proceed to step S108, whereas it makes a negative decision in step S106 if Q≠1 to proceed to step S107. Instep S107, the arithmetic operation circuit 101 subtracts 1 from the value of Q before the operation proceeds to step S117. In step S108, the arithmetic operation circuit 101 sets Q to 5 and then the operation proceeds to step S117. Since 5 is set for Q in place of 1 when an downward rotation is indicated, the value of Q is cyclically set.

In step S109, the arithmetic operation circuit 101 makes a decision as to whether or not operation signals indicating an upward rotation have been input from the switches 110 and 111 of the sub-command dial 14 while the recording image quality setting switch 16 is in an operated state. The upward rotation may be, for instance, a clockwise rotation. The arithmetic operation circuit 101 makes an affirmative decision in step S109 if operation signals indicating an upward rotation have been input to proceed to step S110, whereas it makes a negative decision in step S109 if no operation signal indicating an upward rotation has been input to proceed to step S113.

In step S110, the arithmetic operation circuit 101 makes a decision as to whether or not the flag S is set to 3. The arithmetic operation circuit 101 makes an affirmative decision in step S110 if S=3 (the number of recording pixels is set to "L-size") to proceed to step S112, whereas it makes a negative decision in step S110 if S≠3 to proceed to step S111. In step S111, the arithmetic operation circuit 101 adds 1 to the value of S before the operation proceeds to step S117. In step S112, the arithmetic operation circuit 101 sets S to 1 and then the operation proceeds to step S117. Since 1 is set for S in place of 3 when an upward rotation is indicated, the value of S is cyclically set.

In step S113, the arithmetic operation circuit 101 makes a decision as to whether or not operation signals indicating a downward rotation have been input from the switches 110 and 111 of the sub-command dial 14 while the recording image quality setting switch 16 is in an operated state. The downward rotation may be, for instance, a counterclockwise rotation. The arithmetic operation circuit 101 makes an affirmative decision in step S113 if operation signals indicating a downward rotation have been input to proceed to step S114, whereas it makes a negative decision in step S113 if no operation signal indicating an downward rotation has been input to proceed to step S119.

In step S114, the arithmetic operation circuit 101 makes a decision as to whether or not the flag S is set to 1. The arithmetic operation circuit 101 makes an affirmative decision in step S114 if S=1 (the number of recording pixels is set to "S-size") to proceed to step S116, whereas it makes a negative decision in step S114 if S≠1 to proceed to step S115. In step S115, the arithmetic operation circuit 101 subtracts 1 from the value of S before the operation proceeds to step S117. In step S116, the arithmetic operation circuit 101 sets S to 3 and then the operation proceeds to step S117. Since 3 is set for S in place of 1 when a downward rotation is indicated, the value of S is cyclically set.

Figure 12:
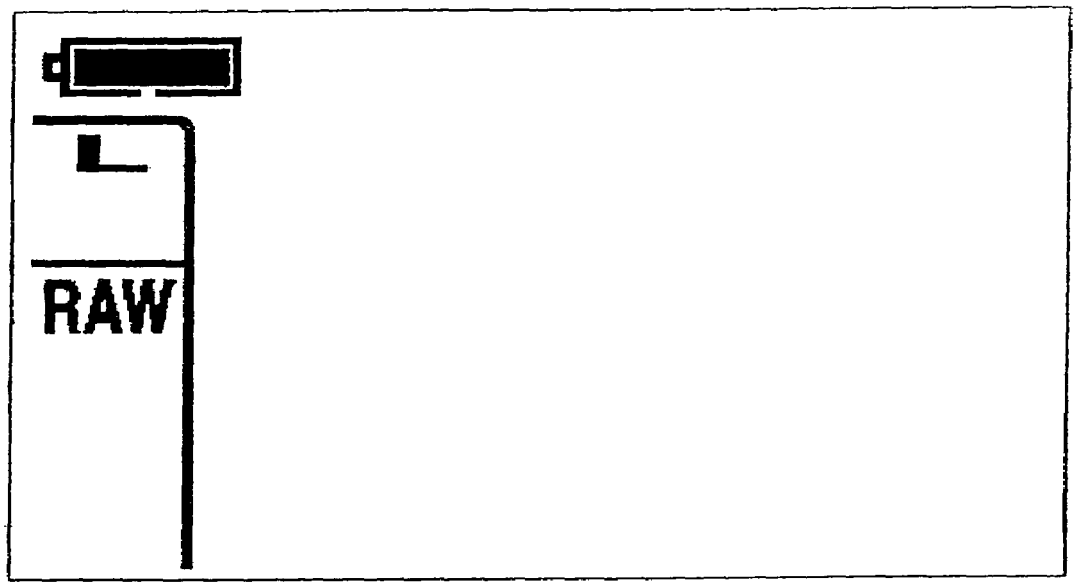
FIG. 12 presents an example of a display that may be brought up when the recording image quality is set.

In step S117, the arithmetic operation circuit 101 outputs a command for the display drive circuit 118 to bring up the display indicating the recording image quality and the number of recording pixels at the display device 12 before the operation proceeds to step S120. FIG. 12 presents an example of a display that may be brought up at the display device 12 when the recording image quality is set by operating the recording image quality setting switch 16. In FIG. 12, "L-size" and "RAW" are displayed in the segments 21 and 22 respectively indicating the number of recording pixels and the recording image quality that have been selected.

In step S120, the arithmetic operation circuit 101 makes a decision as to whether or not the power switch has been turned on. The arithmetic operation circuit 101 makes an affirmative decision in step S120 if a power ON operation signal has been input from the ON operation switch 113 to proceed to step S118, whereas it makes a negative decision in step S120 if no power ON operation signal has been input to proceed to step S21 shown in FIG. 5.

In step S118, the arithmetic operation circuit 101 makes a decision as to whether or not the recording image quality setting switch 16 is in an operated state. The arithmetic operation circuit 101 makes an affirmative decision in step S118 if an operation signal has been input from the recording image quality setting switch 16 to return to step S101, whereas it makes a negative decision in step S118 if no operation signal has been input and ends the processing shown in FIG. 11 before proceeding to step S4 shown in FIG. 4.

Figure 13:
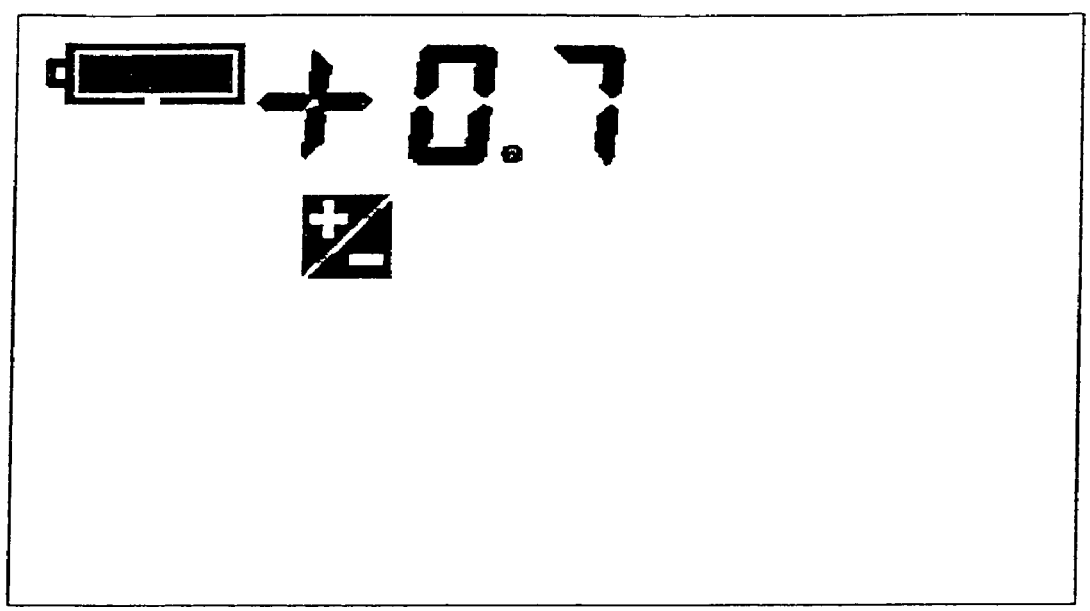
FIG. 13 presents an example of a display that may be brought up when the exposure correction setting is selected.
Figure 14:
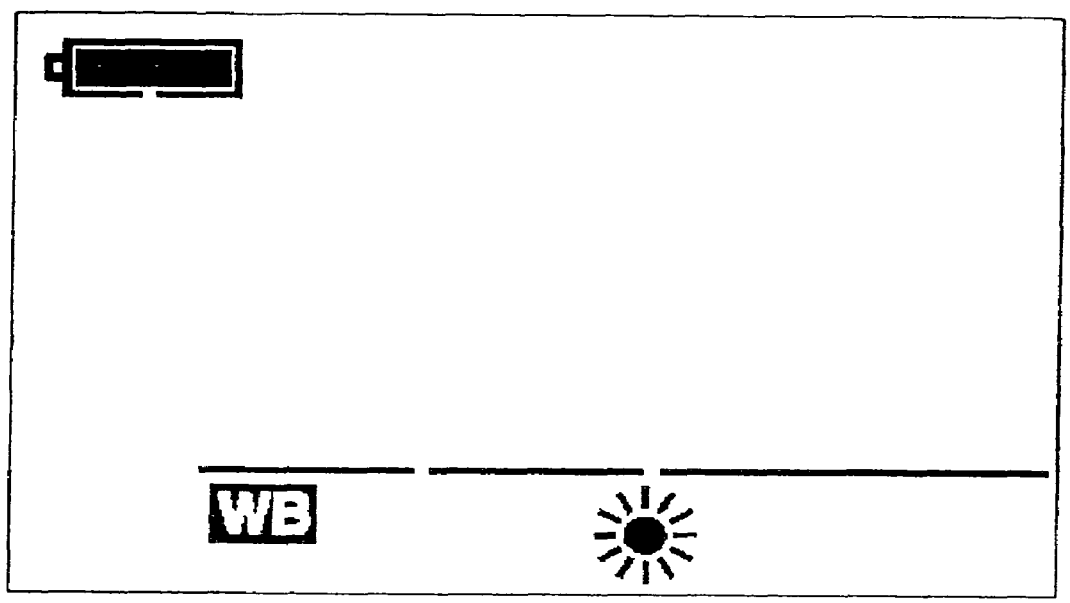
FIG. 14 presents an example of a display that may be brought up when the white balance adjustment setting is selected.

In step S119, to which the operation proceeds after making a negative decision in step S113 as described above, the arithmetic operation circuit 101 executes processing for setting and displaying other functions before ending the processing shown in FIG. 11 and proceeds to step S4 shown in FIG. 4. The other functions that are set at this point include the exposure correction and the white balance adjustment. FIG. 13 presents an example of a display that may be brought up at the display device 12 when the exposure correction setting is selected by operating the exposure correction switch 17. In FIG. 13, "+0.7" displayed in segment 23 (see FIG. 2) indicates that the exposure is corrected by changing the control exposure value EV by 0.7 stages along the +direction. FIG. 14 presents an example of a display that may be brought up at the display device 12 when the white balance is selected by operating the white balance setting switch 18. In FIG. 14, the display displayed in segment 26 indicates that the manual WB for bright sunlight illumination has been set. If no operation signal has been input from the exposure correction switch 17 or the white balance setting switch 18, the arithmetic operation circuit 101 ends the processing shown in FIG. 11.

The following advantages are achieved in the electronic camera in the embodiment described above.

(1) The arithmetic operation circuit 101 of the electronic camera repeatedly checks whether or not a memory card 106 has been loaded into the electronic camera when the power switch is in an OFF state (when a negative decision is made in step S28). The arithmetic operation circuit 101 executes the following processing depending upon the check results.

(a) If the flag H is set to 1 (the presence of a memory card 106 has been previously detected) and the number of remaining frames N at the memory card 106 is equal to the value (the previously calculated number of remaining frames) stored at the register I (an affirmative decision is made in step S33) when it is decided that the memory card 106 is present in the electronic camera (an affirmative decision is made in step S30), the display at the display device 12 remains off. Thus, since no display is brought up unless a memory card 106 is loaded/unloaded (replaced), the power consumption is reduced.

(b) If the flag H is set to 0 (the presence of a memory card 106 has not been previously detected) when it is decided that the memory card 106 is currently not present in the electronic camera (when a negative decision is made in step S30), the display at the display device 12 remains off. Thus, since no display is brought up until a memory card 106 is loaded/unloaded, the power consumption is reduced (c) If the flag H is set to 0 (the presence of a member card 106 has not been previously detected) when it is decided that the memory card 106 is present in the electronic camera (when an affirmative decision is made in step S30), the number of remaining frames N at the memory card 106 is displayed in the numerical value segment 27 at the display device 12 over the predetermined length of time T. Thus, when a memory card 106 (including a replacement) has been newly loaded into the electronic camera, the number of remaining frames N in the new memory card is displayed at the display device 12, making it possible to verify the number of remaining frames N in the memory card 106 without having to turn on the main switch 11 of the camera. In addition, since only the numerical value segment 27 among the segments at the display device 12 is displayed to indicate the number of remaining frames over the predetermined length of time T, power consumption is reduced compared to that in a camera in which the other segments are also displayed or the display of the number of remaining frames remains displayed continuously beyond a predetermined length of time.

(d) If the flag H is set to 1 (the presence of the memory card 106 has been previously detected) when it is decided that the memory card 106 is not currently present in the electronic camera (when an negative decision is made in step S30), "-E-" indicating that no memory card 106 is present is displayed in the numerical value segment 27 at the display device 12 over the predetermined length of time T. Thus, when the memory card 106 has been unloaded from the camera (including when it has been unloaded to be replaced by another memory card), the absence of a memory card is indicated at the display device 12, making it possible to verify that the memory card 106 has been unloaded without having to turn on the main switch 11 of the camera. In addition, since only the numerical value segment 27 among the segments at the display device 12 is displayed over the predetermined length of time T, power consumption is reduced compared to that in a camera in which the other segments are also displayed or the display of the number of remaining frames remains displayed continuously beyond a predetermined length of time. Furthermore, since only the number of frames at the memory card 106 is displayed, the photographer can easily ascertain that the main switch 11 is in an OFF state and only the necessary information is displayed to avoid confusing the photographer.

(e) The arithmetic operation circuit 101 makes a decision with regard to the presence/absence of the memory card 106 (step S45) even while the display is on over the predetermined length of time T, as described in (c) and (d) above and, as a result, if a new memory card 106 is loaded into the empty electronic camera (if an affirmative decision is made in step S46) or if the memory card 106 in the electronic camera is unloaded (if an affirmative decision is made in step S50), the operation returns to step S37 to repeatedly execute the decision making processing described above. Thus, details conflicting the actual memory card loaded/unloaded state are not allowed to remain on display at the display device 12 and, furthermore, updated details can be displayed over the specific length of time.

(2) When a setting element (the number of recording pixels, the recording image quality, the exposure correction setting or the white balance setting in the example explained above) is adjusted, only the segment corresponding to the setting element being adjusted is used for display at the display device 12 and the other segments are not used and remain unlit. Since no information unrelated to the setting adjustment is displayed and the irrelevant display segments remain unlit, the photographer can easily check the adjusted setting element on display without any distraction.

Second Embodiment

Figure 15:
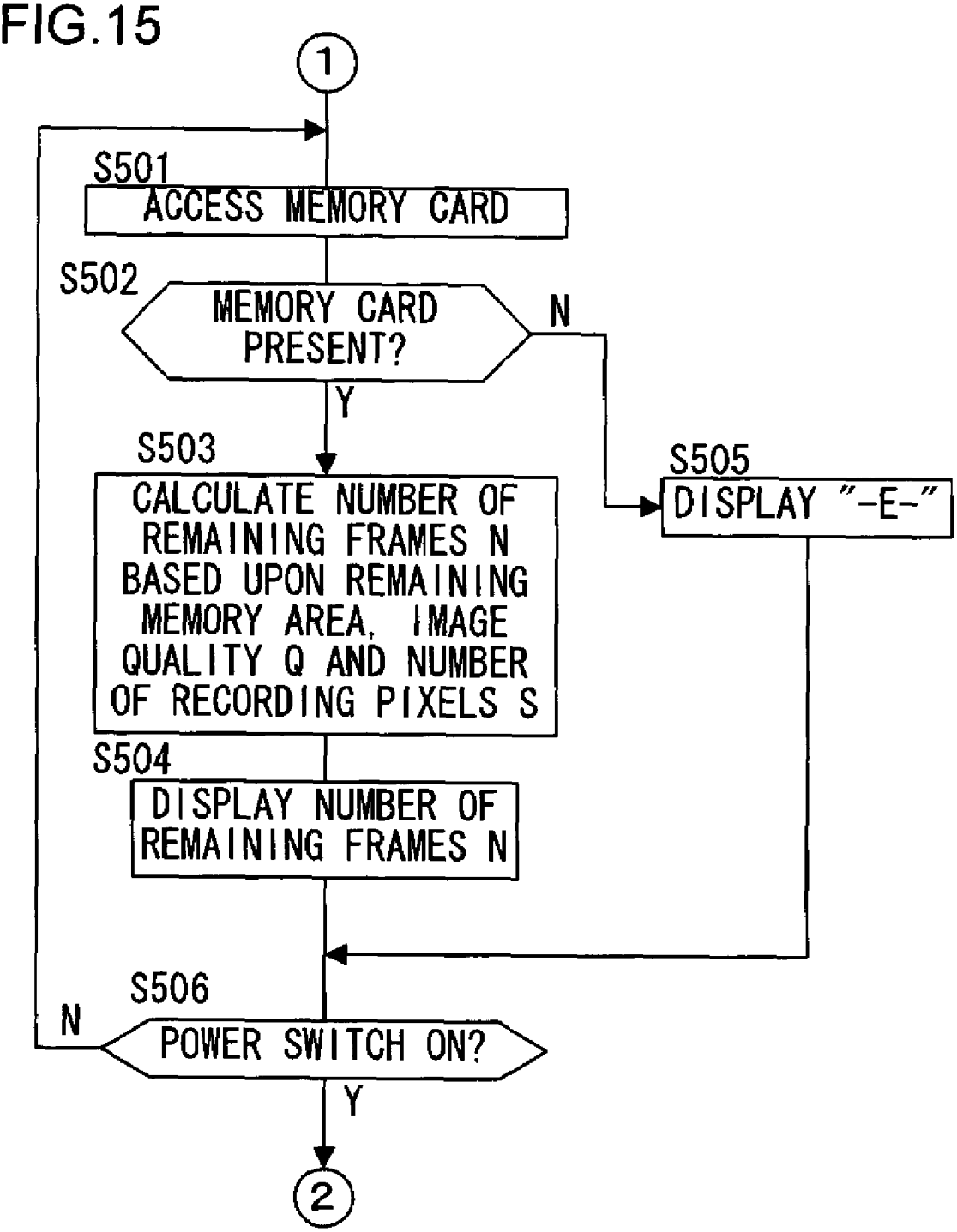
FIG. 15 presents a flowchart of the processing executed in the arithmetic operation circuit of an electronic camera according to a second embodiment when the power is in an OFF state.

The number of remaining frames at the memory card 106 or the information indicating that no memory card 106 is present in the electronic camera may remain on display at all times while the power switch is in an OFF state. FIG. 15 presents a flowchart of the processing executed by arithmetic operation circuit of the electronic camera according to the second embodiment when the power is in an OFF state. The processing shown in FIG. 15 is executed in place of the processing shown in FIGS. 5 and 6 executed in the first embodiment.

In step S501 shown in FIG. 15, the arithmetic operation circuit 101 outputs a command for the controller 107 to access the memory card 106, and then the operation proceeds to step S502. In step S502, the arithmetic operation circuit 101 makes a decision as to whether or not the memory card 106 has been loaded into the camera. If the controller 107 having accessed the memory card 106 as described above detects the presence of the memory card 106 in the camera, the arithmetic operation circuit 101 makes an affirmative decision in step S502 to proceed to step S503, whereas if the presence of the memory card 106 in the camera is not detected, the arithmetic operation circuit 101 makes a negative decision in step S502 to proceed to step S505.

In step S503, the arithmetic operation circuit 101 calculates the number of remaining frames N of images that can be recorded into the available area based upon the recording capacity corresponding to the available (remaining) area at the memory card 106 detected by the controller 107 and the number of recording pixels and the recording image quality set at the electronic camera, and then the operation proceeds to step S504.

In step S504, the arithmetic operation circuit 101 outputs a command for the display drive circuit 118 to display the value representing the number of remaining frames N at the display device 12 before the operation proceeds to step S506. FIG. 9 presents an example of a display that may be brought up at the display device 12 at this time.

In step S506, the arithmetic operation circuit 101 makes a decision as to whether or not the power switch has been turned on. The arithmetic operation circuit 101 makes an affirmative decision in step S506 if a power ON operation signal has been input from the ON operation switch 113 to return to step S3 shown in FIG. 4, whereas it makes a negative decision in step S506 if no power ON operation signal has been input to return to step S501.

In step S505, the arithmetic operation circuit 101 outputs a command for the display drive circuit 118 to display "-E-" at the display device 12 indicating that no memory card 106 has been loaded into the electronic camera before the operation proceeds to step S506. FIG. 10 presents an example of a display that may be brought up at the display device 12 at this time.

In the second embodiment described above, the photographer is able to check the number of remaining frames N at the memory card 106 and the absence of a memory card in the electronic camera without having to turn on the main switch 11 of the camera, as in the first embodiment.

Figure 16:
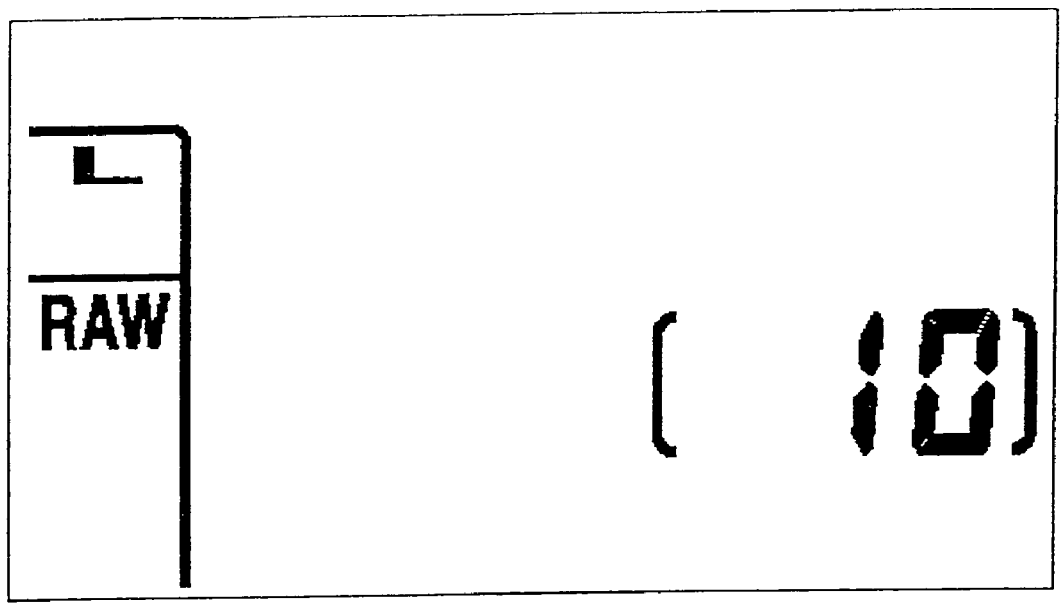
FIG. 16 presents an example of a display of the number of remaining frames that may be brought up when power is in an OFF state.
Figure 17:
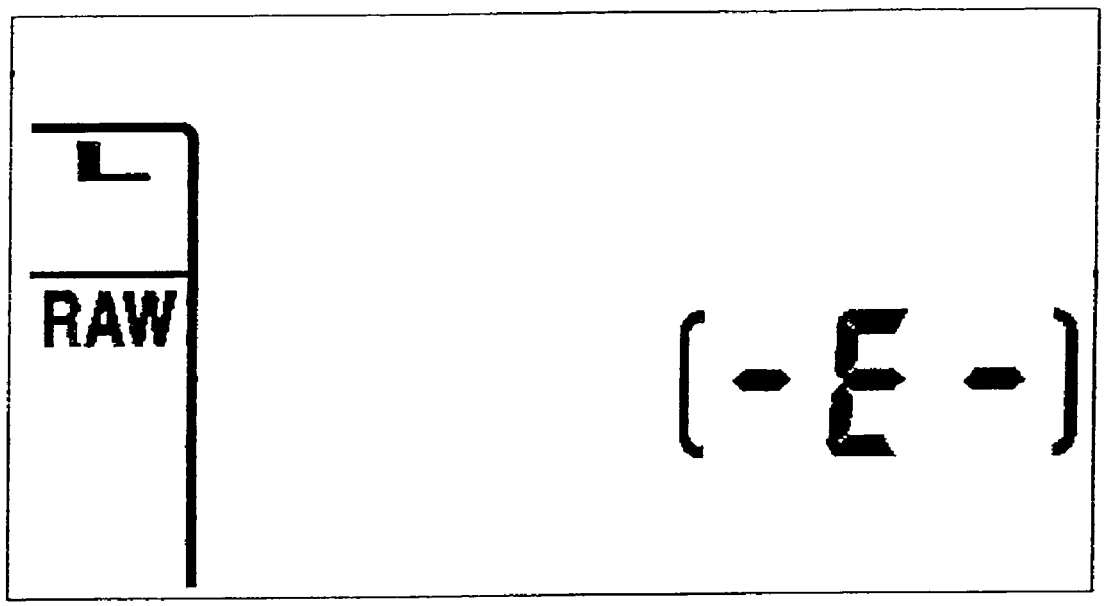
FIG. 17 presents an example of display that may be brought up when the power is in an OFF state and no memory card is loaded.

In the first and second embodiments explained above, the number of remaining frames N at the memory card 106 or the absence of a memory card 106 in the camera is indicated by itself in the display at the numerical value segment 27 of the display device 12 when the power switch is in an OFF state (see FIGS. 9 and 10). Instead, the number of recording pixels and the recording image quality set at the electronic camera may be displayed together with the number of remaining frames N or the information indicating the absence of a memory card 106. FIGS. 16 and 17 each show the number of recording pixels, the recording image quality and the number of remaining frames (the absence of a memory card) displayed respectively in segment 21, segment 22 and the numerical value segment 27. By displaying the number of recording pixels and the recording image quality together with the number of remaining frames N, the photographer is able to estimate the remaining available capacity at the memory card 106. Since this allows the photographer to take appropriate action such as increasing the number of remaining frames N by adjusting the number of recording pixels or the image quality or replacing the memory card 106 when the number of remaining frames N that are available is not sufficient, a camera that affords further ease of operation for the photographer is achieved.

In the explanation given above, the number of remaining frames N of images that can be recorded into the memory card 106 is displayed at the display device 12. Instead, the number of frames of images obtained through photographing that have already been recorded or of value obtained by adding 1 to the number of recorded frames (the frame number assigned to the frame of an image to be obtained through the next photographing operation) may be displayed. The number of recorded frames equals the number of images having been recorded into the memory card 106.

The memory card 106 does not need to be an IC memory such as a flash memory installed in a card package, and may instead be constituted of a data storage device that can be detachably mounted at the camera.

In the explanation given above, the number of remaining frames N of images that can be recorded into the memory card 106 loaded in the electronic camera is repeatedly calculated when the main switch is in an OFF state. If it is only necessary to display the number of remaining frames when the main switch is in an OFF state, the number of remaining frames having been calculated while the main switch has been in an ON state and having been stored into a memory backed up by the batteries or a nonvolatile memory may be displayed.

While the term "circuit" is used in the explanation given above as in the arithmetic operation circuit 101 and the drive circuit 103, the term "circuit" may be replaced by a term "device". For instance, the arithmetic operation circuit 101, the drive circuit 103 and the like may instead be referred to as an arithmetic operation device 101, a drive device 103 and the like.

The above described embodiments are examples, and various modifications can be made without departing from the spirit and scope of the invention.

What is claimed is:

1. An electronic camera comprising:
    an image-capturing element;
    a recording device that records image data constituted of image capturing signals output from the image-capturing element into a data recording medium;
    a control device that calculates a number of frames of image data that have been recorded or can be recorded into the data recording medium;
    a display device at which the number of frames is displayed;
    a power switch of the electronic camera;
    a data recording medium detection device that detects presence/absence of the data recording medium; and
    a switch detection device that detects whether the power switch is in an ON state or an OFF state,
    wherein the control device controls the display device so as to display at least the number of frames when the power switch is in the OFF state, and
    wherein when the power switch is detected to be in the OFF state by the switch detection device, the control device controls the display device so as to display at least the number of frames at the display device over a predetermined length of time in response to a detection of the presence of the data recording medium by the data recording medium detection device.

2. An electronic camera according to claim 1, wherein:
    the display device also displays the information indicating that the data recording medium has not been loaded; and
    when the power switch is detected to be in the OFF state by the switch detection device, the control device controls the display device so as to display at least the information indicating that the data recording medium has not been loaded over a predetermined length of time in response to a detection of the absence of a data recording medium by the data recording medium detection device.

3. An electronic camera according to claim 1, wherein:
    even when the data recording medium detection device detects the presence of a data recording medium, the control device controls the display device so as not to display the number of frames if it is decided that no replacement of the data recording medium has occurred.

4. An electronic camera comprising:
    an image-capturing element;
    a recording device that records image data constituted of image capturing signals output from the image-capturing element into a data recording medium loaded into the electronic camera;
    a control device that calculates a number of frames of image data that have been recorded or can be recorded into the data recording medium;
    a display device at which the number of frames having been calculated is displayed;
    a recording medium replacement detection device that detects a replacement of the data recording medium; and
    a power switch of the electronic camera, wherein:
    the recording medium replacement detection device repeatedly checks whether or not the data recording medium has been replaced when the power switch is in an OFF state;
    if the recording medium replacement detection device detects that the data recording medium has been replaced when the power switch is in the OFF state, the control device calculates the number of frames of image data that have been recorded or can be recorded into a new data recording medium having replaced the data recording medium; and
    the display device displays at least the calculated number of frames of image data that have been recorded or can be recorded into the new data recording medium when the power switch is in the OFF state.

5. An electronic camera according to claim 4, wherein:
    if the recording medium replacement detection device does not detect that the data recording medium has been replaced when the power switch is in the OFF state, the display device does not display the number of frames calculated by the control device.

6. An electronic camera according to claim 4, wherein:
    the display device displays at least a shutter speed and an aperture effective during a photographing operation in addition to the number of frames when the power switch is in the ON state, and display the number of frames alone when the power switch is in the OFF state.

7. An electronic camera according to claim 4, wherein:
    the display device displays at least the calculated number of frames of image data that have been recorded or can be recorded into the new data recording medium over a predetermined length of time when the power switch is in the OFF state.

8. An electronic camera according to claim 4, wherein:
    the recording medium replacement detection device also repeatedly checks whether or not the data recording medium is present when the power switch is in the OFF state; and
    if the recording medium replacement detection device detects that the data recording medium is not present when the power switch is in the OFF state, the display device displays the information indicating that the data recording medium has not been loaded.

9. An electronic camera according to claim 4, wherein:
    the control device enables an image-capturing operation in response to an image-capturing start signal when the power switch is in the ON state, and disenables the image-capturing operation when the power switch is in the OFF state.

10. An electronic camera according to claim 9, further comprising:
    a shutter release button, wherein:
    the image-capturing start signal is input to the control device in response to an operation of the shutter release button.

* * * * *